United States Patent [19]

Arliguie et al.

[11] 4,280,324
[45] Jul. 28, 1981

[54] FUEL DISTRIBUTION DEVICE

[75] Inventors: Jean-Claude M. Arliguie; Marc F. B. Buisson, both of Le Mee sur Seine; Jacques E. J. Caruel, Dammarie les Lys, all of France

[73] Assignee: Societe Nationale d'Etude et de Construction de Moteurs d'Aviation, Paris, France

[21] Appl. No.: 944,616

[22] Filed: Sep. 21, 1978

[30] Foreign Application Priority Data

Sep. 27, 1977 [FR] France ............................ 77 28981

[51] Int. Cl.³ .............................................. F02K 3/10
[52] U.S. Cl. ...................................... 60/261; 60/739; 60/749
[58] Field of Search .......................... 60/739, 749, 261

[56] References Cited

U.S. PATENT DOCUMENTS

| 2,920,449 | 1/1960 | Johnson et al. | 60/739 |
| 2,929,201 | 3/1960 | Lindsey | 60/746 |
| 2,949,012 | 8/1960 | Ferrie et al. | 60/746 |
| 2,951,341 | 9/1960 | Henning et al. | 60/739 |
| 2,974,488 | 3/1961 | Eggers et al. | 60/746 |
| 3,102,392 | 9/1963 | Bauger et al. | 60/739 |
| 3,618,318 | 11/1971 | Bryce | 60/749 |

Primary Examiner—Robert E. Garrett
Attorney, Agent, or Firm—Bacon & Thomas

[57] ABSTRACT

The invention concerns a fuel distribution device in a high velocity gaseous flow. The device consists of two coaxial, toric injection manifolds placed in close proximity with respect to each other, pierced by small diameter uniformly distributed orifices and arranged to introduce fuel into the flow. The orifices in the manifold located downstream with respect to the direction of the flow of gases, are arranged on the face turned upstream of the manifold, in a circular row coaxial with it.

It is the object of the invention to reduce the drag induced in the flow by the devices presently in use, while improving the distribution of the fuel; it finds particularly advantageous applications in the afterburner ducts of gas turbine engines.

13 Claims, 6 Drawing Figures

FUEL DISTRIBUTION DEVICE

BACKGROUND OF THE INVENTION

The present invention concerns a device to distribute fuel in a high velocity gaseous flow, for use particularly in the afterburner duct of a turbojet engine.

Afterburner devices provided on turbojet engines are for the purpose of increasing the thrust of the turbojet engines by burning additional fuel after the passage of gases through the turbine. This combustion generally takes place in a duct of generally cylindrical form, in which one or more fuel injection and distribution devices are located, having annular shapes, followed in the downstream direction by one or several flame stabilizes, also of an annular shape. The fuel injected generally by means of toric manifolds with orifices for the introduction of the fuel into the flow. Hereinafter, a torus will be defined as a volume generated by a surface rotating around an axis located in the plane of the surface but not cutting it. The distribution of the fuel is effected by obstacles, or anvils, located in front of orifices drilled into manifolds. Flame stabilizers consist of generally "V" shaped annular elements located downstream of the injection manifolds. Particular attention must be paid to the concept and the disposition of the different elements in the duct in order to obtain homogeneous distribution and the finest possible atomization of the fuel, while reducing to a minimum the loss of pressure caused in the jet. The latter condition is especially critical in the case of flow at high Mach numbers such as encountered in the afterburner ducts of the propulsion units of supersonic aircraft.

SUMMARY OF THE INVENTION

It is an object of the invention to provide a system for the injection and distribution of fuel, or a distributor device, which satisfies the above conditions.

According to the invention, every toric fuel injection manifold used in the conventional system is replaced by two toric manifolds coaxial with the jet, having essentially identical right cross section, each smaller than that of a single manifold, located adjacent to each other, the diameter of the toric annulus constituting each manifold being of the order of the diameter of the single manifold. If the flow channel is not cylindrical, but of the shape of a truncated cone, the median radius of the two manifolds will preferentially "follow" the profile of the channel, i.e. the ratio of the median radius of a torus and the radius of the channel in the same transverse plane will remain constant. It should be understood that the entirety of the two manifolds will be able to produce the same maximum flow rate as the single manifold.

The division of the single manifold into two parts as described hereinabove results in a reduction of the loss of pressure in the flow because of the reduced maximum cross section of the injection system. The division into two manifolds also has the advantage of easier control of the flow rate by providing for separate regulation of the fuel supply to the two manifolds. The fuel supply to the two ramps may also be effect at diametrically opposed points, which favors a more homogeneous distribution of the fuel in the channel. Fuel is injected into the channel by means of orifices drilled into the two manifolds.

According to the invention, the orifices of the manifold for the injection of fuel located downstream with respect to the direction of the flow of the gases are distributed uniformly on a circle coaxial with said manifold. The axis of each of the orifices is located in an axial plane of the channel and intercepts the torus located upstream without intersecting the portion of the axis common to both tori situated between the transverse planes in which said tori are located. This arrangement makes it possible to inject the fuel supplied to the downstream manifold with a large velocity component in the direction opposed to that of the flow of gases. Additionally, in the absence of other devices, the fuel injected by the downstream manifold will strike the upstream manifold thus assuring its distribution in the channels; the fuel jets thus being dispersed toward the inside and the outside of the tori. It should be noted that the distribution of the fuel between the inside and the outside of the tori may be modulated by providing a suitable orientation of the axes of the injection orifices.

Concerning the manifold located upstream, various modes of embodiment are envisioned, according to the disposition of the injection orifices drilled into said manifold, according to the relative position of the said orifices with respect to the orifices of the downstream manifold and according to the design of the fuel distribution devices or anvils.

In a first variant of embodiment the injection orifices drilled in the manifold located upstream are distributed uniformly throughout an annular row, coaxial with the manifold and on the face of said manifold turned into the upstream direction. The axis of each of said orifices is located in an axial plane of the channel and its orientation is such that the component parallel to the axis of the flow of the velocity of the fuel injected is greater than its transverse component; the fuel thus injected therefore has a large velocity component in the direction opposed to that of the flow of the gases. To insure the homogenous distribution of the fuel, an anvil is placed upstream of the manifold so as to intercept the jets of fuel issuing from said manifold. The anvil consists of an annular element coaxial with the manifold, having a median diameter identical with that of the upstream manifold and a maximum radial dimension of its right cross section at the most equal to the maximum radial dimension of the right cross section of the torus, and a concavity facing the injection orifices.

In a second variant, the orifices of the manifold located upstream are uniformly distributed in an annular row over the downstream face of said manifold. The axis of each of these orifices is contained in axial plane of the channel and intercepts the upstream torus without intersecting the common axis of the tori between the transverse planes containing the tori. The planes containing the axes of the orifices of the two tori are interposed between them; in this manner alternating locations of the orifices of each manifold are obtained. To assure the distribution of the fuel issuing from the two rows of orifices, a single annular element assuming the role of an anvil is interposed between the two manifolds so as to intercept the jets of fuel issuing from said manifolds. This anvil is coaxial with the channel, its median radius being proportional to the radius of the channel in its own plane in the same ratio as the median radii of the manifolds are proportional to the radius of the channel in their plane. The maximum radial dimension of the right section of the anvil is of the same order of magnitude as that of the tori. Various configurations may be considered for this element, such as a common annular type, flat ring, annulus with an "I" cross section or an annulus presenting a concavity facing each manifold. The latter arrangement makes it possible to influence the distribution of the fuel between the outside and the inside of the tori by providing evolutive radii of curvature for the concavities; it will be recalled that another means of affecting said distribution is the orientation of the orifices drilled into the manifolds.

In a third variant each of the manifolds carries an anvil consisting of an annular part coaxial and integral with it. The arrangement of the injection orifices is identical with that of the preceding variant. The anvil is form by a flat ring coaxial with the manifold and a diameter identical with that of said manifold; the radial width of the ring is approximately equal to the maximum radial dimension of the right cross section of the torus carrying it. Holes are provided in the ring opposite the injection orifices of the manifold to which the ring is fastened. The ring that is integral with one manifold plays the role of anvil for the orifices of the opposing manifold. The effective portion of the anvil is limited to the regions effectively stricken by the jets of the fuel. It is thus possible to retain only these regions and interrupt the rings in between. The anvil may thus consist, as a variant, of a series of elemental anvils proper to each orifice and forming a succession of annular segments arranged between the injection orifices of each manifold.

In a fourth mode of embodiment the injection orifices of the upstream manifold are distributed in an annular row on the face of said manifold turned into the downstream direction. In contrast to the last two variants described, the axis of each of the orifices is located in an axial plane containing the axis of one orifice the downstream manifold, the axes of the two types of orifices are thus mingled or secant in this plane. In this case, the fuel is dispersed by means of the interactio-between the jets of fuel issuing from the two manifolds; in this manner, "fluid anvils" are produced. This arrangement, however, reduces the possibility of regulating the flow of the two manifolds, if good dispersion is to be achieved.

BRIEF DESCRIPTION OF THE DRAWINGS

The description which follows hereafter with reference to the figures attached hereto, will aid in a better understanding of the possible embodiments of the fuel distribution device of the invention.

DESCRIPTION OF THE PREFERRED EMBODIMENTS

In the figures the section of the tori was chosen to be circular fo convenience of representation, it should be understood, however, that other shapes may be employed, for example, oblong. For the same reason, the tori are shown with identical diameters.

Figure 1:
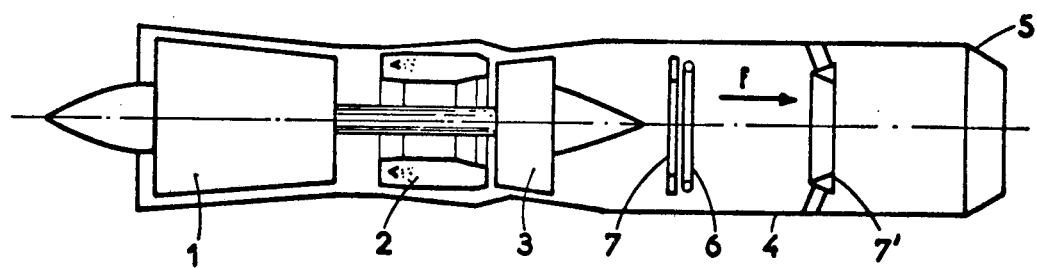
FIG. 1 represented diagrammatically a gas turbine engine equipped with an afterburner duct.

The gas turbine engine shownin FIG. 1 comprises from upstream to downstream one or more compressor stages 1, a combustion device 2, one or more turbines 3, and an afterburner duct 4, in which the gases flow in the direction indicated by the arrow f, preceding the jet nozzle 5. In the afterburner duct 4, fuel distribution devices and flame stabilizing devices are placed. One of each of these devices is shown. The fuel distribution device is formed by a toric manifold 6 pierced by orifices which issue jets of fuel upstream with respect to the direction of the flow of gases in the example chosen, and an annular obstacle or anvil 7 placed upstream of the manifold 6, which intercepts the jets of fuel in order to disperse them. The flame stabilizing device 7' is located downstream from the fuel distributing device and consists of a gutter with a "V" section.

For high afterburning rates, the fuel flow required in the duct 4 makes it necessary to use manifolds with large cross section, which leads to an increase in the loss of pressure in said duct. In addition, it is difficult to vary the flow of fuel within a large range without affecting the quality of its atomization.

Figure 2:
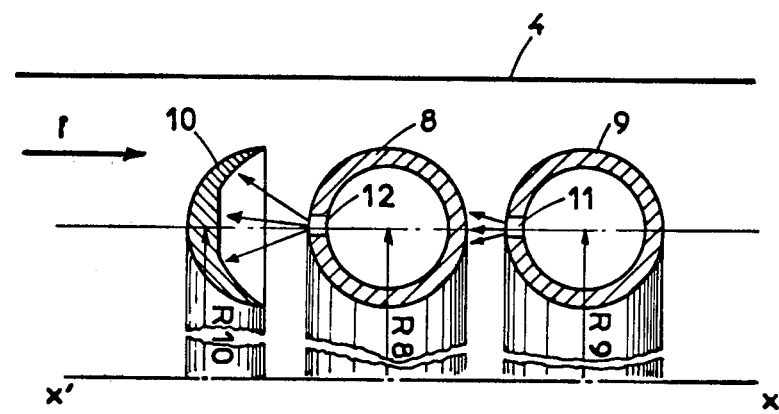
FIG. 2 represents a first form of embodiment of a fuel distribution device according to the invention in keeping with the first variant described hereinabove.

According to the invention, the conventional one manifold with a large transverse cross section is replaced by two manifolds placed closely adjacent to each other, having essentially identical cross sections but with reduced transverse cross section. FIG. 2 shows diagrammatically a first form of embodiment of the fuel distribution device according to the invention to semi-section in an axial plane of the channel. The flame stabilizing devices are omitted. The distribution system of the invention consists of two tori 8, 9, coaxial with the duct 4 and supplied separately with fuel, and an anvil 10 located upstream from the torus 8. The torus 9 is pierced by the orifices 11, distributed uniformly in an annular row over the upstream face of said torus, the axis of each of the orifices being in a plane containing the common axis X'X of the two tori and intercepting the torus 8 without intersecting said axis. The fuel supplied to the torus 9 is thus introduced in the channel in the form of jets which strike the downstream face of the torus 8, which thus plays the role of an anvil. The positions and orientations chosen for the orifices 11 may differ from those shown, in view of what had been said hereinabove. The torus 8 is pierced by orifices 12, uniformly distributed in an annular row on the face of said torus turned upstream. The axis of each of the orifices 12 intercepts the anvil 10 and is located in an axial plane of the channel. The fuel jets thus injected impinge upon the anvil 10 which disperses them in the channel. The anvil 10 is formed by an annular element with an average diameter equal to that of the tori, having a right section with a maximum radial height equal to the maximum radial dimension of the tori and displaying a concavity turned toward the orifices 12. The radius of curvature of said concavity may be evolutive to affect the distribution of fuel between the inside and the outside of the element 10. The median radii R8, R9, R10 of the manifolds 8, 9 and of the anvil 10, respectively, are in a constant proportional relationship with the radius of the channel in the plane in which they are measured. This enables the distribution system of the invention to follow the profile of the channel.

Figure 3:
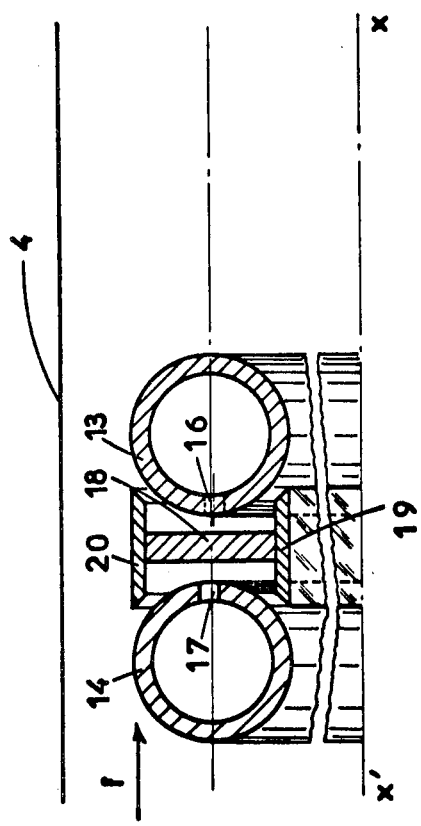
FIGS. 3, 4 and 5 each represent a form of embodiment of the second variant.

FIG. 3 represents a fuel distribution system according to the invention conforming to the second variant of embodiment. The distribution system comprises two coaxial tori 13 and 14, with essentially equal cross sections and diameters and an anvil 15 interposed between said tori. The anvil 15 here is formed by a planar ring. The torus 13, located downstreams, is pierced on its face turned in the upstream direction by orifices 16 uniformly distributed in an annular row coaxial with it. The axis of each of the orifices 16 is located in an axial plane of the channel and intercepts the torus 14 without cutting the portion of the axis X'X common to both tori, between the transverse planes containing the tori. The torus 14 is pierced on its face turned in the downstream direction by orifices 17, uniformly distributed over an annular row coaxial with it. The axis of each of the orifices 17 is located in an axial plane of the channel interposed between two planes containing the axes of the orifices 16 and intercepting the anvil 15. This arrangement enables the fuel issuing from the orifices 16 and 17 to retain substantial velocity components parallel to the flow. The fuel jets issuing from the orifices 16 and 17 impinge the anvil 5, which disperses them.

Figure 4:
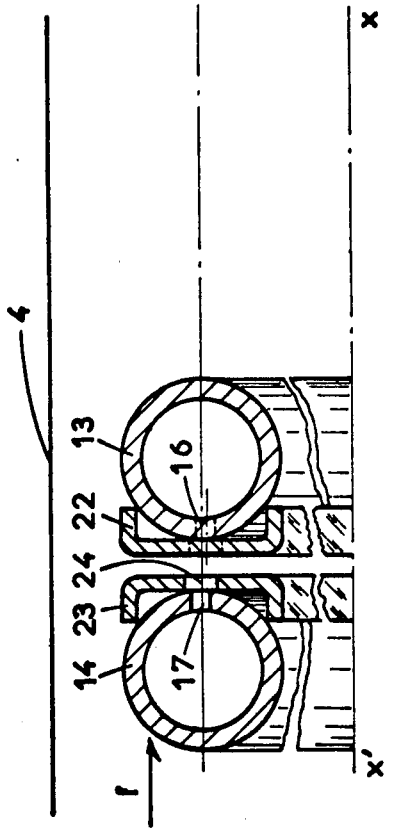

FIG. 4 is analogous to the preceding figure, only the anvil 15 being modified. It consists of a planar ring 18 coaxial with the channel, two ferrules 19, 20 being fastened to the external and internal periphery of said ring and the assembly thus displaying an "I" shaped cross section, in an axial plane.

Figure 5:
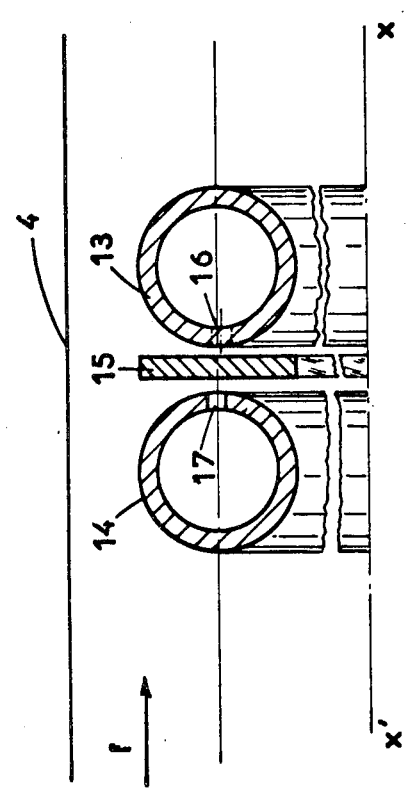

FIG. 5 which is analogous to the two preceding figures, shows another form of the anvil. The latter here consists of an annular element 21 coaxial with the channel and presenting a concavity to face the injection orifices of each tori. The curvature of the concave faces is determined so as to obtain a suitable distribution of the fuel between the outside and the inside of the anvil.

In a general fashion, the median diameters of the anvils 15, 18 and 21 of FIG. 3, 4 and 5, respectively, and the median diameters of the manifolds 13 and 14, maintain a constant proportional relationship with the diameter of the channel at the location where they are measured, so as to follow the profile of the channel. The maximum radial height of the right section of each of the anvils 15, 18 and 21 is of the order of magnitude of those of the tori 13 and 14.

Figure 6:
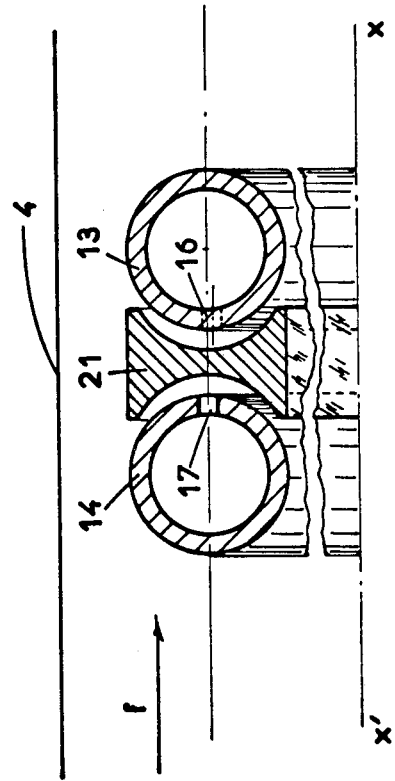
FIG. 6 represents a mode of embodiment of the third variant.

FIG. 6 corresponds to the third variant of embodiment of a distribution device according to the invention. The two manifolds 13 and 14 into which the orifices 16 and 17 are pierced, each carry an annular element 22, 23 consisting of a ring having a "U" shaped cross section in an axial plane, with its cohcavity turned toward the manifold to which it is secured and presenting a flat surface facing the opposite manifold. Orifices such as 24 are pierced into each ring at the height of the orifices of injection of the manifold to which it is fastened. The height of the flat surface of each ring measured in the radial direction is of the order of magnitude of the maximum radial dimension of the torus which carries it. It should be noted that the effective part of each anvil is limited to the area impacted by the fuel. It is, therefore, possible to eliminate the inoperative parts of the ring and to design for each orifice of the manifold a particular anvil located between the orifices of the opposite manifold, each of these elemental anvils representing a segment of a ring, such as 22 or 23.

It is also possible to employ a fourth variant (not shown) is which the injection holes of the two tori are not offset angularly, but face each other. In this case, the anvil may be eliminated. A type of fluid anvil is thus created.

The distribution device of the invention, in addition to reducing the obstruction of the channel to which it belongs produces an appreciable improvement of the distribution and homogenization of the fuel in the flow. It also serves to extend the range of fuel flow variation.

I claim:

1. Fuel distribution device in a channel for high velocity gas flow in the afterburner duct of a gas turbine engine, comprising: two toric injection manifolds within and coaxial with the channel, located in two planes perpendicular to the axis of said channel, the ratio of the median radii of each manifold and of the channel as measured in the same transverse plane being constant, said manifolds being pierced by small diameter orifices uniformly distributed for the introduction of liquid fuel into the gas flow, and wherein: the orifices in the manifold located downstream with respect to the direction of the flow of the gases are arranged in the upstream face of said manifold in a circular row coaxial with it, the axis of each of the orifices being contained in an axial plane of the channel and said manifolds being in sufficiently close proximity that liquid fuel emitted by said orifices would impinge on the upstream manifold and be atomized thereby into the gas stream in said channel, and the axis of the orifices in said downstream manifold intercept the torus located upstream without intersecting the portion of the axis common to both manifolds located between the transverse planes containing said manifolds, said channel being substantially free of obstructions radially inwardly and outwardly of said manifolds.

2. Fuel distribution device according to claim 1 wherein the orifices in the manifold located upstream are distributed over the downstream face of said manifold in a circular row coaxial with it, the axis of each of the orifices being located in an axial plane of the channel and intercepting the torus located downstream without intersecting the portion of the axis common to both manifolds located between the transverse planes containing them.

3. Fuel distribution device according to claim 1, characterized in that the planes containing the axes of the orifices of one of the manifolds are interposed between the planes containing the axes of the orifices of the other manifold.

4. Fuel distribution device according to claim 2, wherein a fuel distribution device or anvil, is located in front of the injection orifices of each manifold.

5. Fuel distribution device according to claim 4, wherein the fuel distribution device consists of a single annular element interposed between the two manifolds and is coaxial with them, said element having a median radius proportional to the radius of the channel at the same ratio as are the median radii of the tori and a maximum radial dimension of its right section of the order of magnitude of the maximum radial dimension of the right section of the tori.

6. Fuel distribution device according to claim 5, wherein the single annular element consists of a planar ring.

7. Fuel distribution device according to claim 5, wherein the single element comprises a planar ring and two ferrules secured to the internal and external peripheries of said ring so as to display an "I" shaped right section.

8. Fuel distribution device according to claim 5, wherein the single annular element has a concavity facing the injection orifices of each manifold.

9. Fuel distribution device according to claim 4, wherein each manifold is equipped with a planar ring, coaxial with and secured to it, the maximum radial dimension of the right section of said ring being of the order of magnitude of that of the torus to which it is secured, and that it faces the other manifold so as to constitute an anvil for the injection orifices pierced in the latter manifold, each ring comprising holes at the height of the orifices of the manifold to which it is secured.

10. Device according to claim 9, wherein each ring is interrupted so as to form a succussion of segments located between the orifices of one manifold and facing the orifices pierced in the other manifold.

11. Device according to one of claims 1 or 2, wherein the planes containing the axes of the orifices of the manifolds are the same planes.

12. Fuel distribution device according to claim 1, wherein the orifices pierced in the manifold located upstream are distributed over the upstream face of said manifold in a circular row coaxial with it, the axis of each of the orifices being located in an axial plane of the channel and oriented so as to inject the fuel with a substantial velocity component in the direction opposed to the flow of the gases.

13. Device according to claim 12, wherein an annular fuel distribution device or anvil, is located in front of the injection orifices of the upstream manifold.

* * * * *